(No Model.)
W. H. ROBINSON.
COMBINED SACK FILLER AND SCOOP.
No. 438,948. Patented Oct. 21, 1890.
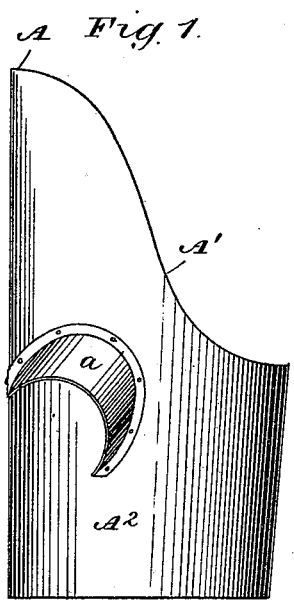
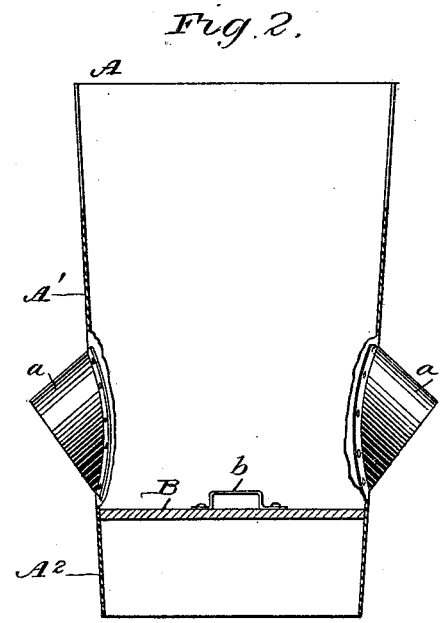
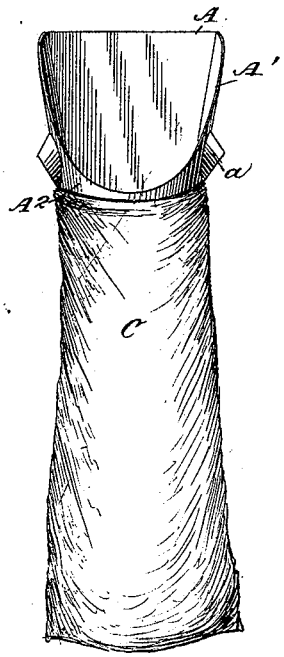
WITNESSES:
Paul Jolot
C. Sedgwick
INVENTOR:
W. H. Robinson
BY
ATTORNEYS

UNITED STATES PATENT OFFICE.

WALTER H. ROBINSON, OF HICKSON, ASSIGNOR OF ONE-HALF TO MATTIE P. DAVIES, OF FARGO, NORTH DAKOTA.

COMBINED SACK-FILLER AND SCOOP.

SPECIFICATION forming part of Letters Patent No. 438,948, dated October 21, 1890.

Application filed July 1, 1890. Serial No. 357,458. (No model.)

*To all whom it may concern:*

Be it known that I, WALTER H. ROBINSON, of Hickson, in the county of Cass and State of North Dakota, have invented a new and Improved Combined Sack-Filler and Scoop, of which the following is a full, clear, and exact description.

My invention relates to improvements in sack-fillers and grain-scoops; and the object of my invention is to produce a device which will form a very convenient scoop and which may also be used as a sack-filler.

To this end my invention consists in a scoop having a cylindrical body adapted to be inserted in a sack, said body being provided with a removable bottom.

Reference is to be had to the accompanying drawings, forming a part of this specification, in which similar letters of reference indicate corresponding parts in all the figures.

Figure 1 is a side elevation of the device embodying my invention. Fig. 2 is a vertical transverse section of the same, and Fig. 3 is a front elevation of the device as applied to a sack.

The device is intended to be used chiefly as a grain-scoop and for filling bags with grain. It is provided with a flaring flattened end A, that it may easily enter a body of grain or slide upon a floor, with beveled or curved sides A' to enable it to hold a convenient quantity of grain and to be easily thrust into the same, and with a cylindrical body portion $A^2$, tapering slightly toward the bottom, said portion being hollow, so that the grain in the scoop may pass through the body portion and into a sack. The device is provided with suitable ears or handles $a$, set diagonally on each side, to enable it to be easily operated. A bottom B fits closely within the bottom portion $A^2$, said bottom having a suitable handle $b$, to enable it to be easily inserted or removed.

When the device is used as an ordinary scoop, the bottom B is inserted in the body portion $A^2$, thus securely closing said portion, and when the device is used as a sack-filler the bottom B is removed, the body portion $A^2$ is inserted in the top of a sack C, the grain is scooped in the usual manner, and the grain in the scoop will quickly flow through into the sack.

In using the device as a grain-scoop and sack-filler the operator inserts the body $A^2$ in the mouth of the sack, grasps the edges of the sack and the handles $a$, which, owing to the diagonal arrangement of the handles, is easily done, the operator clasping the bag onto the scoop, and then scoops up the grain, which flows through into the sack, and to facilitate the operation the device is made large enough to fill an ordinary sack at two operations; but it is obvious that it may be used for a great variety of purposes and that it may be made in any desired size. I find the most convenient form to be that shown in the drawings, the widest part of the device being at the flattened end A and the narrowest at the bottom of the cylindrical portion $A^2$. The device will thus hold a large quantity of grain, and it may be easily directed into the sack.

Having thus described my invention, I claim as new and desire to secure by Letters Patent—

1. The combination, with a scoop having a hollow body portion, of a removable bottom adapted to fit within said body portion, substantially as described.

2. The combination, with a scoop having laterally-extending ears or handles and a hollow tapering body portion, of a removable bottom fitting within the body portion and having a suitable handle attached thereto, substantially as described.

WALTER H. ROBINSON.

Witnesses:
FRED E. DAVIES,
JOHN W. SEARING.